United States Patent
Adler et al.

(10) Patent No.: US 10,810,027 B2
(45) Date of Patent: *Oct. 20, 2020

(54) CAPTURING COMPONENTS OF AN APPLICATION USING A SANDBOXED ENVIRONMENT

(71) Applicant: VMware, Inc., Palo Alto, CA (US)

(72) Inventors: Nir Adler, Herzliya (IL); Dima Golbert, Herzliya (IL); Avshi Avital, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,902

(22) Filed: Dec. 24, 2018

(65) Prior Publication Data

US 2019/0129736 A1 May 2, 2019

Related U.S. Application Data

(63) Continuation of application No. 15/364,256, filed on Nov. 29, 2016, now Pat. No. 10,162,653.

(Continued)

(51) Int. Cl.
*G06F 9/445* (2018.01)
*G06F 9/455* (2018.01)
(Continued)

(52) U.S. Cl.
CPC ............ *G06F 9/45504* (2013.01); *G06F 8/61* (2013.01); *G06F 9/45558* (2013.01);
(Continued)

(58) Field of Classification Search
CPC .................................................. G06F 9/45504
(Continued)

(56) References Cited

U.S. PATENT DOCUMENTS 8,607,224 B2 * 12/2013 Kohler ................. G06F 9/4484
717/174
8,666,938 B1 * 3/2014 Pancholy ................ G06F 9/455
707/610

(Continued)

OTHER PUBLICATIONS

Kevin Knox, et al. "Magic Quadrant for Client Management Tools" Gartner, May 22, 2014 ID: G00260863, downloaded from http://www.creekpointe.com/pdfs/LANDesk%20Magic%20Quadrant%20for%20Client%20Management%20Tools.pdf.

*Primary Examiner* — Wei Y Zhen
*Assistant Examiner* — Lanny N Ung (57) ABSTRACT

A management agent operates transparently in the background on each endpoint computing device that needs to be managed. The agent sets up a sandboxed environment on the endpoint computing device on which it is operating in order to capture applications that have been installed on the endpoint device. The application capture is performed after the applications have been installed on the endpoint device and therefore does not require installing the application on any dedicated staging machine, nor any recording of the pre-installation state. The application capture process involves running the application from an isolated sandboxed environment on the computing device in order to identify all necessary components of the application by monitoring accesses by the application to components located outside of the sandbox. The identified components can then be packaged together and managed as individual application packages.

20 Claims, 5 Drawing Sheets

Related U.S. Application Data

(60) Provisional application No. 62/316,083, filed on Mar. 31, 2016.

(51) Int. Cl.
    *G06F 8/61*          (2018.01)
    *G06F 21/53*        (2013.01)
    *G06F 21/62*        (2013.01)
    *G06F 9/48*          (2006.01)

(52) U.S. Cl.
    CPC ............ *G06F 9/4856* (2013.01); *G06F 21/53* (2013.01); *G06F 21/6209* (2013.01); *G06F 2009/45562* (2013.01); *G06F 2221/2101* (2013.01)

(58) Field of Classification Search
    USPC ........................................................ 717/175
    See application file for complete search history.

(56) References Cited

U.S. PATENT DOCUMENTS

| | | | |
|---|---|---|---|
| 2008/0052706 A1* | 2/2008 | Isaacson | G06F 8/63 717/174 |
| 2011/0252430 A1 | 10/2011 | Chapman | |
| 2012/0311702 A1 | 12/2012 | Krstic | |

\* cited by examiner

CAPTURING COMPONENTS OF AN APPLICATION USING A SANDBOXED ENVIRONMENT

CLAIM OF PRIORITY

This Application is a continuation of, and claims benefit of, U.S. patent application Ser. No. 15/364,256, filed on Nov. 29, 2016, entitled "CAPTURING COMPONENTS OF AN APPLICATION USING A SANDBOXED ENVIRONMENT", by Nir Adler, Dima Golbert, and Avshi Avital, which in turn claims benefit of U.S. Provisional Application No. 62/316,083, filed Mar. 31, 2016, entitled "CAPTURING COMPONENTS OF AN APPLICATION USING A SANDBOXED ENVIRONMENT", by Nir Adler, Dima Golbert, and Avshi Avital, all of which are incorporated herein by reference in their entireties.

TECHNICAL FIELD

The present disclosure generally relates to application packaging and application management and more particularly relates to using a sandboxed environment to capture the necessary components that comprise an application.

BACKGROUND

Information Technology (IT) management has become an increasingly complex task for a large organization. There may be thousands of users (e.g. employees) carrying their own individual endpoint devices (e.g. laptops, workstations, smart phones, tablet computers, etc.) and each device may have an abundance of software and applications that are operating on the device. Some of these applications are unique to each individual user, while others are identical across several devices or at least share some of the same components (e.g. files, registry entries, data). Users generally want the freedom to install whatever software and applications they choose while IT departments are faced with the need to maintain compliance and data protection across this complex ecosystem. For example, a typical IT department today needs to be able to manage, secure and deliver applications to users, distribute software updates, as well as be able to back up and restore any user's data and settings on demand.

One requirement for managing applications on such a large scale is being able to produce an application package that can be distributed from a central location to a large number of endpoint devices, where the package can be deployed and executed. There exist a number of software solutions, sometimes referred to as "application capture" systems that attempt to aid organizations in creating such packages. For example, the System Center Configuration Manager (SCCM) available from Microsoft Corporation; the LANDESK Management Suite (LDMS) available from LANDESK Software; and the Client Management Suite (CMS) available from Symantec Corporation; all take different approaches in assisting an IT administrator in application management, including in some cases capturing an application package that could be delivered to end user devices.

Conventional solutions for the capture, delivery and management of applications often leverage recording technologies during the application installation. This generally means that each application must first be installed separately on a dedicated clean staging machine, which could be a virtual machine or a physical computer. For example, one type of process for capturing an application first records the state of the system on the staging machine prior to installing an application (i.e. captures a pre-installation snapshot) and then records the state of the system again after the application has been installed (i.e. captures a post-installation snapshot). Based on a comparison of the pre-installation snapshot and post-installation snapshot, the system is able to compute a delta that indicates which files and registry entries were added, removed, and modified during the installation process. This delta can presumably then be used to determine which components (files, registry entries, etc.) actually comprise the application so that a package containing those components can be created and delivered to multiple endpoint devices.

However, the type of process mentioned above suffers from a number of shortcomings, including the possibility of missing some necessary components of an application. In some situations, the application installation process may require certain files which were already present on the device before the installation and, as such, the installation process might not actually affect those files. In such cases, the pre-installation/post-installation comparison would not indicate that these files were modified by the installation process and, consequently, those files would not be included in the application package. One simple example of such a situation occurs when the capture process attempts to install Microsoft Visio application on a staging machine that already has Microsoft Office preinstalled thereon. Since Microsoft Office contains many of the files that are necessary for Visio, merely looking at the post-installation changes on that machine would not yield all of the required components of Visio. Therefore, when such a package is delivered to another machine (which does not have Microsoft Office preinstalled thereon) the application would not function properly. Additionally, conventional application captures may also be vulnerable to capturing "noise" along with the target files. For example, between the time of pre-installation snapshot and post-installation snapshot, another application may have updated itself, an operating system update may have applied, or another change taken place. The change may have added or modified certain files which are actually unrelated to the application installation, but these changes would be included in the captured package. Including such noise in the application package may cause problems when delivering the package to other machines. Yet another limitation of conventional application capture process described above is that it requires a recording of the pre-installation state, which is not always available in the first place; for example, in the case of legacy applications.

It should be noted that the process described above is just one example of an application capture and not all of its shortcomings may be applicable to all such systems. However, most conventional application capture systems still suffer from at least one form of inefficiency or another. Generally speaking, the inherent difficulty in trying to create an application package using conventional capture systems stems from the large numbers of users, devices and types of software that are involved. Organizations may reach inventories with thousands or even tens of thousands of applications, each of which requires a significant investment in time and resources to capture. Many organizations are intimidated by the amount of work and resources they will need to invest in order to start managing the applications. At the same time, those which are willing to perform all the required manual work to capture applications soon find out that this is an on-going, never-ending process, since for every new version of an application the administrator needs to re-capture the application and repeat the process. Additionally, many conventional application capture systems suffer from incomplete captures and noise during the capture process mentioned above. All of these vulnerabilities cause malfunctions as well as incorrect and unexpected behavior when trying to use the captured application on the endpoint devices. This represents an additional pain point for the organization—testing that the application capture was indeed successful and will work as expected on the end user's actual environment. In light of all of these shortcomings, a more efficient system for capturing and managing applications is needed.

DETAILED DESCRIPTION

Systems and methods in accordance with various embodiments of the present disclosure overcome at least some of the above mentioned shortcomings and deficiencies by providing an improved mechanism for capturing applications and creating application packages that can be executed and managed on endpoint devices. While conventional application capture systems generally take a top-down approach where applications are packaged, inventoried and then delivered to end user devices from a central location, the embodiments described herein enable a bottom-up approach, where instead of capturing applications in a sterile staging environment, applications are captured in their natural environment: on the desktops in use by end-users. This approach allows an administrator of an IT department to regain control over the flurry of user installed applications that end users are using across all of their numerous devices in the organization and allow for a painless and gradual transition to a fully managed application ecosystem.

In various embodiments, an application management agent operates transparently in the background on each endpoint computing device that needs to be managed. The agent sets up a sandboxed environment on the endpoint computing device on which it is operating in order to capture applications that have been installed on the endpoint device. The application capture is performed after the applications have been installed on the endpoint device and therefore does not require installing the application on any dedicated staging machine, nor any recording of the pre-installation state. Further, the application capture is performed seamlessly in the background, without interruption to the user, and without the user even being aware when an application is being captured on her device. The post-installation application capture involves several steps that are used to determine all of the necessary components that comprise the application, which can then be packaged together and managed as individual application packages.

In various embodiments, the agent begins by identifying an application on an endpoint computing device for which an application package will be produced. The agent locates a main executable file for the application and places the main executable file into a sandboxed environment on the endpoint device. Consequently, when a user of the endpoint opens the application, the main executable file is executed in the sandbox and the application runs from the sandboxed environment. The sandbox environment is configured to isolate the code running inside the sandbox such that any calls or accesses by the code to any components are monitored.

In order to determine a set of components of the application installed on the computing device, the sandboxed environment detects all accesses made by the code running inside the sandboxed environment to components located outside of the sandboxed environment and identifies the corresponding components as required components for the application. The set of components can include any resources that comprise the application, including one or more files (including binary files that are capable of being executed), registry entries, folders, modules, other applications, and so on. Thus, when the sandbox environment detects an access by the code in the sandbox to a component located outside of the sandbox, the component is marked as a required component for the application, the component is moved to the sandboxed environment, and the detected access is directed to the component in the sandbox so the application can continue to execute inside the sandbox environment.

When another access is detected by the code inside the sandbox, this time the access may either be by the main executable file or the component that was transferred (e.g., if the component was an executable), to a second component located outside the sandbox, the second component is also marked and transferred to the sandbox, and the detected access is directed to the second component in the sandbox. Accordingly, the process repeats as further application components are identified and transferred to the sandbox until the agent determines that all required components of the application have been identified.

Based on the identified components, the agent is able to produce a complete application package that is comprised of the identified components and any additional resources which might be required in order to execute the application. In another embodiment, the agent can convey the identified components to another location, such as a remote central management server, where the application package can be produced based on the identified components. Once the application package has been produced, it can be remotely managed by the administrator from a remote location. In one embodiment, the application package can be packaged as a virtual hard disk (VHD) file, which can be distributed to other endpoint devices, where it can be executed and managed.

Notably, the entire process can be transparent from the perspective of the user. Namely, when the user opens the application, the application runs the same, from the user's perspective, as it normally would, even though it is running from the sandboxed environment. Thus, the entire process of application capture can be performed in the background without interruption to the user.

As used herein, the term "sandboxed environment" or "sandbox" refers to an isolated environment within a computing device that monitors all accesses by code running within the sandboxed environment. Generally, a sandbox restricts the code from accessing components outside of the sandbox. A sandbox environment can be implemented on a computing device in a variety of ways, for example, a sandbox may be implemented via a virtual machine running on a hypervisor. In an embodiment, the sandbox environment is provided by an application virtualizing tool running on the endpoint device, such as the application virtualization technology called ThinApp, available from VMware, Inc.

Different sandbox environments can take different approaches to isolating an application running in the environment. However, what commonly happens is the environment constructs a manifest of the files it contains. The manifest may contain metadata identifying the listing of all files and directories in the sandbox. For example, the file manifest can contain the file system structure (including all directories, etc.) and a unique identifier (e.g. MD5-Checksum) for each file in the sandbox. Then, using drivers, the sandboxed environment intercepts all calls that the application makes to the file system and checks them against the manifest of files it has (e.g., by comparing the hash signature of the file against the signatures listed in the manifest). If the file in an intercepted call is found in the manifest, then the driver will redirect the request to the file in the sandboxed environment. If the file in the call is marked as deleted by the sandbox environment, it will result in an error in the application's request (even if the file exists outside of the sandbox environment). If the file in the call is not found and not marked as deleted, then the sandbox will do one of two things, according to the sandbox configuration. Either the environment will produce an error that the file is not found, or the sandbox will go to the outside file system and look for the file there.

As will be described in more detail below, for implementation in various embodiments of the invention, a sandbox environment is configured such that if the environment does not find a called or accessed component inside the sandbox, the environment can locate the component outside of the sandbox environment and transfer it to the sandbox environment. In a preferred embodiment, the code of an application such as an application virtualized by an application virtualization tool (e.g. ThinApp) can be modified to perform corresponding functions according to the various embodiments described herein. For example, the code can be modified such that when an application running in the sandbox tries to access a component outside of the sandbox, the driver operating in the environment redirects access and places the component inside the sandbox.

Figure 1:
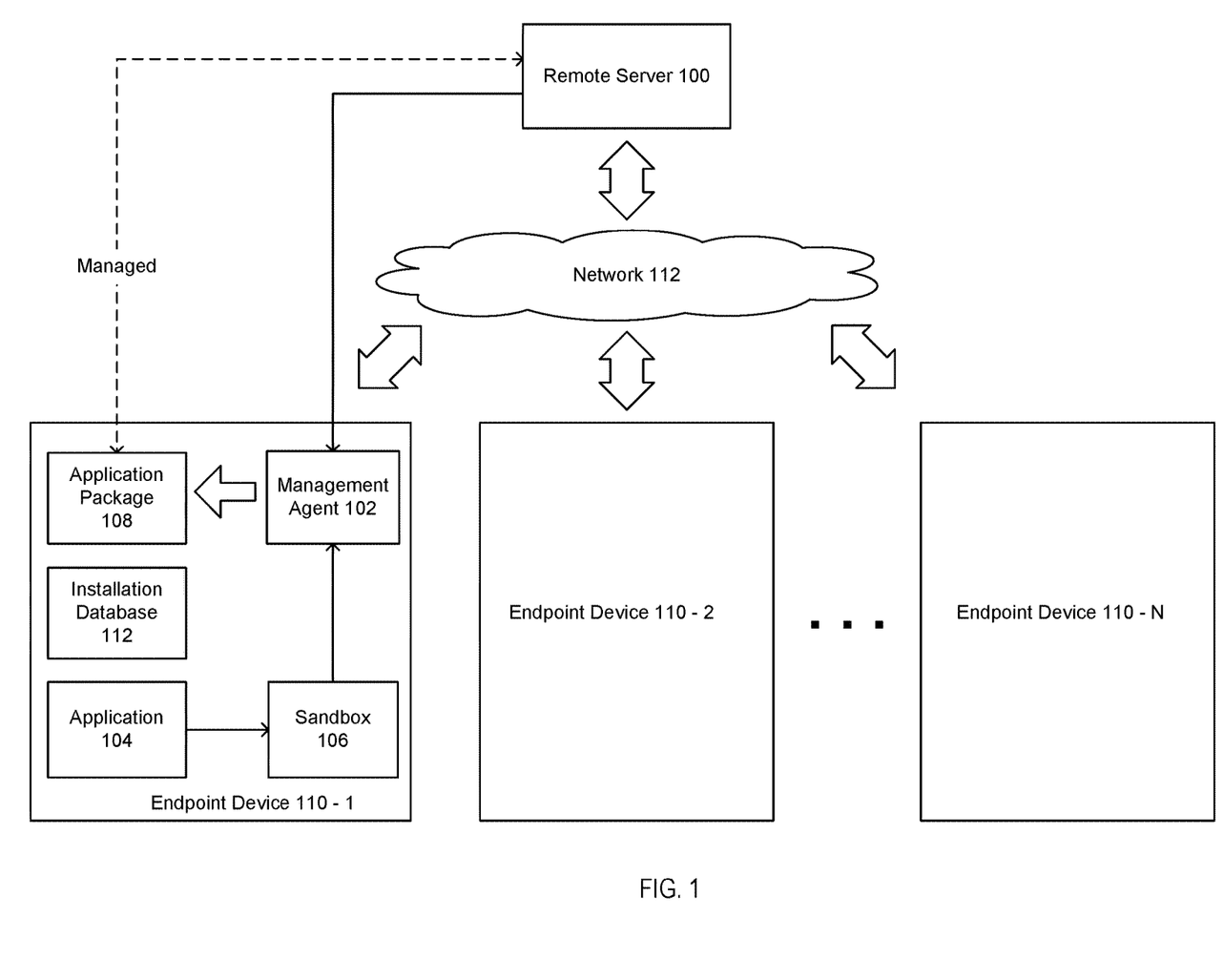
FIG. 1 illustrates an example of a system for capturing application packages on endpoint devices using a sandboxed environment, in accordance with various embodiments.

FIG. 1 illustrates an example of a system for capturing application packages on endpoint devices using a sandboxed environment, in accordance with various embodiments. As illustrated, a remote server 100 is connected via a network 112 to a plurality of endpoint device 110-1, 110-2, 110-N to perform certain management functions on the plurality of endpoint devices. For example, the remote server 100 could be a central management server in an enterprise that is used by an information technology (IT) department to manage endpoint client devices (e.g., 110-1, 110-2, 110-N) on the enterprise network 112. For the sake of being concise, only endpoint device 110-1 is illustrated in exploded view. It will be apparent that an implementation of the invention can contain any number of endpoint devices (e.g., 110-1, 110-2, 110-N) and each endpoint device can contain analogous components and perform analogous functions to those described with respect to device 110-1.

A management agent 102 can be downloaded and installed on an endpoint device 110-1 that is to be managed. In one embodiment, the agent 102 can be downloaded from the remote server 100. The remote server 100 can provide an administrator of the IT department with a console. Once the agent 102 has been downloaded, the console on the remote server 100 can display a list of all applications installed on the endpoint device and enable the user (or administrator) to select which applications should be captured and encapsulated in an application package. In one embodiment, the management agent 102 transparently runs in the background of an existing end-user's desktop and uses several techniques to capture the applications that are currently installed on the desktop.

In various embodiments, after being installed on the endpoint device, the management agent 102 first scans an installation database 112 on the system. The installation database 112 is located in the registry of the endpoint machine 110-1. For example, in the Windows operating system, the installation database is what allows the conventional Add/Remove programs window to be displayed that a user can see, which lists all programs installed on the endpoint device, which the user can select to un-install. Based on scanning the installation database 112, the agent is able to determine which applications are installed on the endpoint computing device 110-1. The agent 102 then presents the user (or administrator) with a choice of which applications the user would like to capture.

In various embodiments, application packages are captured for applications (e.g., 104) that have been identified for being captured. For example, the management agent 102 can receive an instruction from the remote server 100 identifying which applications to capture (e.g., 104). To capture the application 104, the management agent 102 sets up a sandboxed environment 106. The application 104 is run in the sandbox 106 to identify application 104 components, which are then used by the agent 102 to produce an application package 108 for the application 104. The application package 108 can subsequently be conveyed to the server 100, where it can be used to perform management function on other endpoints on the network (e.g., 110-2, 110-N). In other embodiments, the identified components of the application 104 can be conveyed to another location, such as the remote server 100, and an application package for the application 104 can be produced at the remote location, such as the server 100, based on the identified components. Accordingly, in various embodiment, the remote server 100 manages the application package 108, for example by directing its production and subsequent application to other endpoints.

The application 104 capture process using the sandboxed environment 106 spans several steps, which are discussed in detail below. More specifically, FIGS. 2A through 2C, below, illustrate the capturing of components of the application 104 using the sandbox environment 106.

Figure 2A:
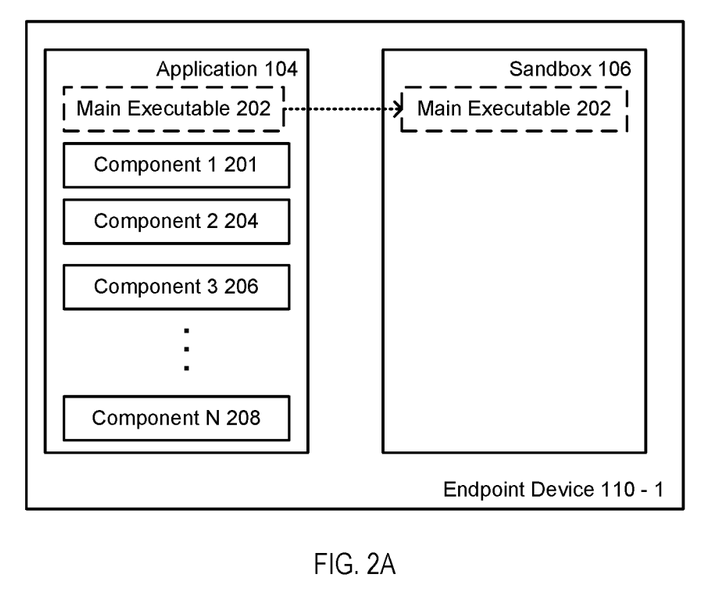
FIG. 2A illustrates an example diagram of a main executable of the application being moved into sandbox environment, in accordance with various embodiments.

FIG. 2A illustrates an example diagram of a main executable of the application being moved into sandbox environment, in accordance with various embodiments. As illustrated, the application 104 that has been identified for producing an application package 108 is comprised of a main executable file 202, component 1 201, component 2 204, and component 3 206 through component N 208. In various embodiment, the main executable file 202 is the initial binary code that runs when the application 104 is started. Various methods can be used to locate the main executable 202 on the endpoint device 110-1. For example, a shortcut (such as a desktop shortcut) generally points to the main executable file of an application. Hence, in an embodiment, the main executable 202 can be retrieved by retrieving the file that is pointed to by a desktop shortcut of the application 104. In another embodiment, the management agent 102 operating on the endpoint device 110-1 can inspect the installation database (e.g. add/remove registry) 112 in order to identify a main executable file of the application.

As illustrated, once the main executable file is located, it is moved into the sandbox environment 106. Thereafter, when the application 104 is executed, it runs from the sandbox environment 106. For example, after the main executable file 202 is moved into the sandbox 106, a user of the device 110-1 may start the application to use it and the application will run from the sandbox 106. This way, the entire process can happen in the background, while the user is using the application, without interruption to the user.

Figure 2B:
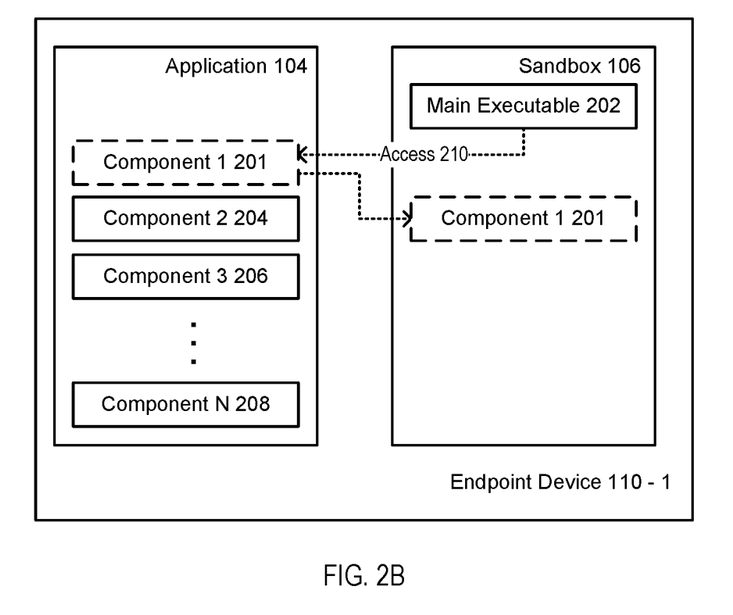
FIG. 2B illustrates an example diagram of a first component of the application being moved into the sandbox, in accordance with various embodiments.

FIG. 2B illustrates an example diagram of a first component of the application being moved into the sandbox, in accordance with various embodiments. As illustrated, once the main executable 202 is executed in the sandbox 106, the sandbox 106 monitors any calls or accesses made by the main executable 202. If an access 210 to component 1 201 outside of the sandbox is detected, the component 1 201 is identified as a necessary component of the application and moved to the sandbox environment 106. The sandbox environment then directs the access 210 to the component 1 201 in the sandbox 106 and the application 104 continues to run. At this point, if the main executable 202 needs to access component 1 201 again, which is now inside the sandbox 106, the access will be permitted inside the sandbox environment 106.

Figure 2C:
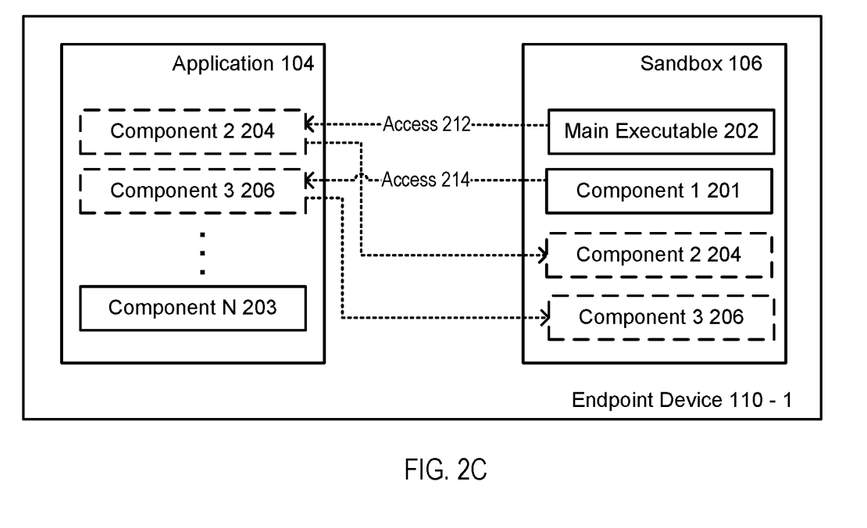
FIG. 2C illustrates an example diagram of a second component and a third component of the application being moved into the sandbox, in accordance with various embodiments.

FIG. 2C illustrates an example diagram of a second component and a third component of the application being moved into the sandbox, in accordance with various embodiments. As illustrated, component 1 201 has been placed in the sandbox 106 and the application 104 continues to run from the sandbox 106. The sandbox 106 continues to monitor the code running inside the sandbox 106 for any accesses to components, except now the accesses may be made by either the main executable 202 or by component 1 201 (e.g., if component 1 201 is an executable file, a module, an application, etc.).

If an access 212 by the main executable 202 to component 2 204 outside of the sandbox 106 is detected, the component 2 204 is identified as a necessary component of the application 104 and is moved to the sandbox environment 106. Further, the sandbox environment 106 directs the access 212 to the component 2 204 inside the sandbox 106 and the application 104 continues to run. Similarly, if an access 214 made by component 1 201 to component 3 206 outside of the sandbox is detected, the component 3 206 is identified as a necessary component of the application 104 and is moved to the sandbox environment 106. Further, the sandbox environment 106 directs the access 214 to the component 3 206 inside the sandbox 106 and the application 104 continues to run. As mentioned, component 1 201 may make calls to other components, such as component 3 206, if component 1 201 is, for example, an executable file, a module, or an application that runs in the sandbox.

Thus, as illustrated in FIGS. 2A-3A, as the application runs in the sandbox, the sandbox monitors all accesses by the code in the sandbox and brings outside components that are accessed by the code into the sandbox, while identifying the moved components as necessary components of the application. Initially, outside accesses by the main executable are monitored and components called by the main executable are brought into the sandbox. As components are added to the sandbox, the environment monitors outside accesses made by the main executable as well as accesses made by the added components. The process continues until all components of the application are deemed to be collected, or until a triggering event to stop the component capture process takes place.

For example, the management agent can determine, based on a detected triggering event, to stop the component capture process, and proceed to the next step of producing the application package 108 based on the identified components. In this context, a variety of triggering events can be implemented. For example, a triggering event may occur when the application stops running (e.g., when the user closes the application). In another embodiment, a triggering event may occur when a predetermined amount of time passes after the application is initially executed. In another embodiment, a triggering event may occur after the application has executed for a predetermined amount of time (e.g., several minutes).

Yet another triggering event may occur when the number of accesses made by the code running inside the sandbox environment decreases by a predetermined metric. In various embodiments, such a metric can be based on the frequency of accesses. For example, the agent 102 can keep track of the accesses made by the code running inside the sandbox 106. The triggering event may occur when the agent 102 detects a dramatic decrease in the frequency of accesses. The dramatic decrease may be measured as a certain percentage decrease in frequency of accesses, or as a drop in frequency of accesses to a level below a predetermined threshold, or as a drop in frequency by a predetermined amount. In another embodiment, the triggering event may occur when there have been no accesses to components outside of the sandboxed environment for at least a predetermined period of time.

Figure 3:
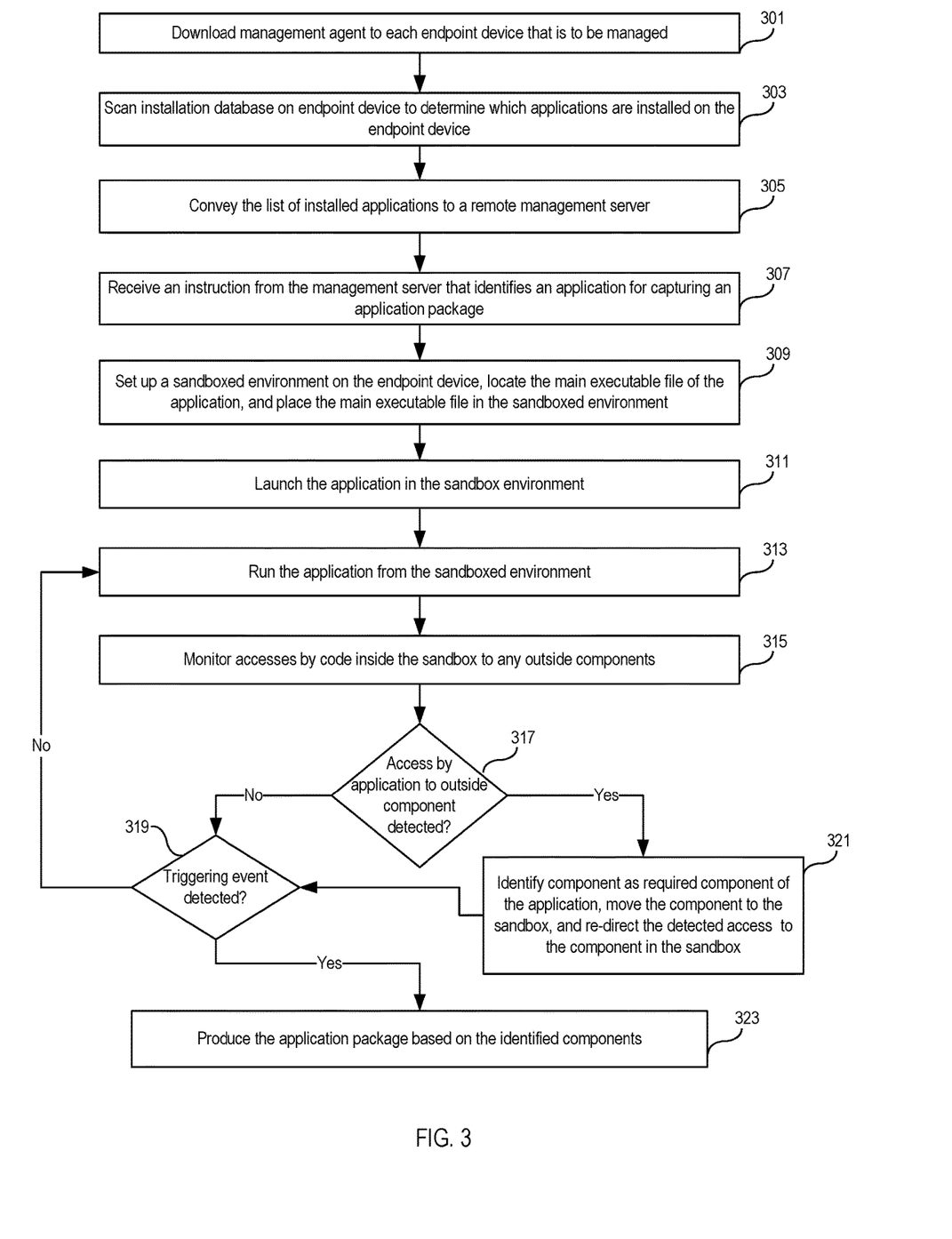
FIG. 3 illustrates an example of a process for capturing an application package using a sandboxed environment, in accordance with various embodiments.

FIG. 3 illustrates an example of a process for capturing an application package using a sandboxed environment, in accordance with various embodiments. As illustrated in operation 301, the process begins by downloading and installing a management agent to each endpoint device that is to be managed. In operation 303, once the agent is downloaded to the endpoint device, the agent scans the installation database on the endpoint device to determine which applications are installed on the endpoint device. In operation 305, the agent conveys the list of installed applications to a remote management server (e.g., where an administrator can make a determination regarding which application(s) to capture). In operation 307, the agent receives an instruction from the management server that identifies an application for capturing an application package. Consequently, in operation 309, the agent sets up a sandboxed environment on the endpoint device, locates the main executable file of the application, and places the main executable file in the sandboxed environment.

In operation 311, the application is launched in the sandbox environment, such as by executing the main executable file in the sandbox. In various embodiments, the application may be launched when a user of the endpoint device opens the application on the endpoint device to use the application. In operation 313, the application runs from the sandboxed environment. After the application starts running, in operation 315, the sandboxed environment monitors accesses by code inside the sandbox to any outside components. In decision 317, the logic determines whether an access by the application to a component outside of the sandbox is detected.

If an outside access to a component is detected in operation 317, then the logic proceeds to operation 321, where the component is identified as a required component of the application, the component is moved to the sandbox, and the detected access is re-directed to the component inside the sandbox. Thereafter, in decision 319, the agent determines if a triggering event has been detected. If a triggering event has not been detected, then the code returns to operation 313 and the application continues to run from the sandbox environment, now with the main executable and the component that was transferred both inside the sandbox.

Again, the accesses of the code (now the main executable and the transferred component) to any outside components are monitored (operation 315). If, in operation 317, an outside access to a second component is detected again (which may now be an access by the main executable or by the previously added component), then the process continues by identifying the component as a required component of the application, moving the component into the sandbox, and redirecting the access to the component (operation 321).

Hence, as long as accesses by the application to outside components are detected in operation 317, the components continue to be added to the sandbox (operation 321) and the code continues to run (operation 313) until a triggering even is detected (operation 319).

Also, if an access is not detected in decision 317, then the logic proceeds to decision 319, where it determines whether a triggering event is detected 319. If a triggering event is not detected, then the logic returns back to operation 313 and the application continues to run from the sandboxed environment.

Once a triggering event is detected in operation 319, the logic proceeds to operation 323, where the component capturing process stops and an application package is produced based on any identified components.

Figure 4:
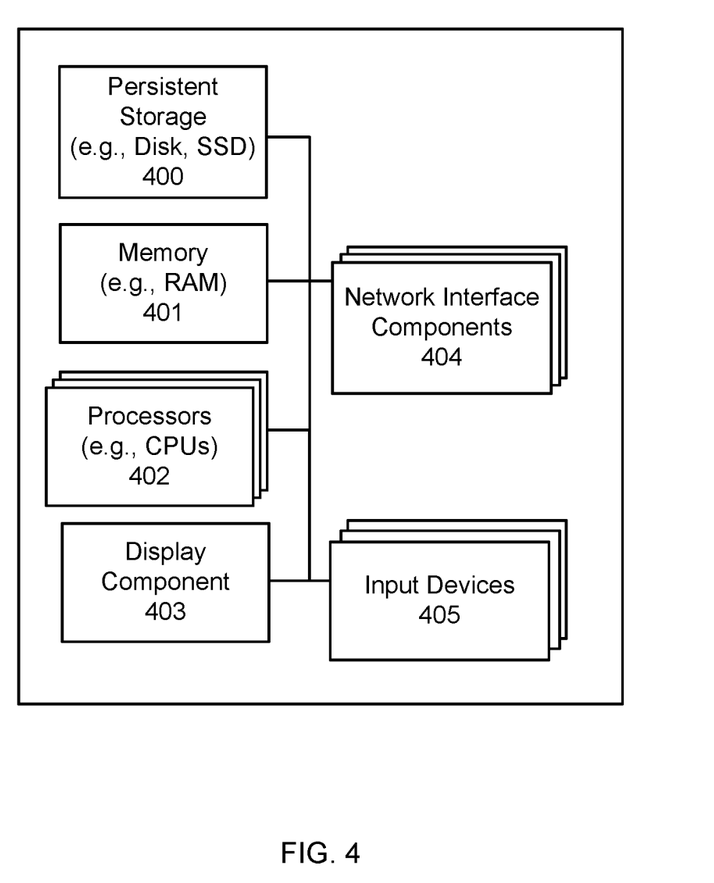
FIG. 4 illustrates an example of some general components of a computing device, in accordance with various embodiments.

FIG. 4 illustrates an example of some general components of a computing device, in accordance with various embodiments. In this particular example, the device includes one or more processors (e.g., central processing units (CPUs) 402 for executing instructions that can be stored in a storage medium component. The storage medium can include many types of memory, persistent data storage, or non-transitory computer-readable storage media. For example, the storage medium may take the form of random access memory (RAM) 401 storing program instructions for execution by the processor(s) 402, a persistent storage (e.g., disk or SSD) 400, a removable memory for sharing information with other devices and/or the like. The computing device typically can further comprise a display component 403, such as a monitor, a touch screen, liquid crystal display (LCD), or the like. In various embodiments, the computing device will include at least one input device 405 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 404 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for capturing an application package containing components of an application from an endpoint device on which the application is installed by a remote server in communication with an application management agent executing on the endpoint device, comprising:
    conveying an instruction to the application management agent from the remote server to capture the application package;
    in response to the instruction, by the application management agent,
        setting up a sandboxed environment on the endpoint device, the sandboxed environment being an isolated environment within the endpoint device that monitors all accesses by code running within the sandboxed environment;
        locating a main executable file of the application on the endpoint device;
        moving the main executable file to the sandboxed environment;
        launching the application in the sandboxed environment by executing the main executable file in the sandboxed environment; and
        identifying the components of the application, comprising: detecting, by the sandboxed environment, accesses to components of the application located outside of the sandboxed environment by the main executable file executing in the sandboxed environment.

2. The method of claim 1, wherein identifying the components of the application further comprises:
    moving the components of the application located outside of the sandboxed environment that are accessed by the main executable file executing in the sandboxed environment into the sandboxed environment;
    detecting, by the sandboxed environment, accesses to further components of the application located outside of the sandboxed environment by the application components moved into the sandboxed environment; and
    moving the further components of the application into the sandboxed environment.

3. The method of claim 1, further comprising:
creating the application package comprised of the main executable file and the identified components of the application, the application package being deployable on a second endpoint device to install the application on the second computing device.

4. The method of claim 1, further comprising:
conveying, by the application management agent, the main executable file and the identified application components to the remote server;
on the remote server, creating the application package comprised of the main executable file and the identified components of the application, the application package being deployable on a second endpoint device to install the application on the second computing device.

5. The method of claim 1, further comprising:
identifying, by the application management agent, what applications are installed on the endpoint device;
conveying, by the application management agent, information identifying the installed applications to the remote server;
indicating, to an administrator, the installed applications and prompting the administrator to select installed applications for which to capture application packages;
receiving an indication from the administrator to capture an application package for the application; and
in response to the indication from the administrator, sending the instruction to the application management agent from the remote server to capture the application package.

6. The method of claim 1, wherein the sandboxed environment is implemented on the endpoint device via one of:
    a virtual machine running on a hypervisor; or
    an application virtualizing tool running on the endpoint device.

7. The method of claim 1, wherein the application is launched inside the sandboxed environment when a user of the endpoint device opens the application to use the application.

8. A computing device for capturing an application package containing components of an application from an endpoint device on which the application is installed by a remote server in communication with an application management agent executing on the endpoint device, comprising:
    at least one processor; and
    memory including instructions that, when executed by the at least one processor, cause the computing device to perform the steps of:
        conveying an instruction to the application management agent from the remote server to capture the application package;
        in response to the instruction, by the application management agent,
            setting up a sandboxed environment on the endpoint device, the sandboxed environment being an isolated environment within the endpoint device that monitors all accesses by code running within the sandboxed environment;
            locating a main executable file of the application on the endpoint device;
            moving the main executable file to the sandboxed environment;

launching the application in the sandboxed environment by executing the main executable file in the sandboxed environment; and identifying the components of the application, comprising: detecting, by the sandboxed environment, accesses to components of the application located outside of the sandboxed environment by the main executable file executing in the sandboxed environment.

9. The computing device of claim 8, wherein identifying the components of the application further comprises:

moving the components of the application located outside of the sandboxed environment that are accessed by the main executable file executing in the sandboxed environment into the sandboxed environment;

detecting, by the sandboxed environment, accesses to further components of the application located outside of the sandboxed environment by the application components moved into the sandboxed environment; and moving the further components of the application into the sandboxed environment.

10. The computing device of claim 8, wherein the memory further includes instructions that when executed by the at least one processor, cause the computing device to perform the steps of:

creating the application package comprised of the main executable file and the identified components of the application, the application package being deployable on a second endpoint device to install the application on the second computing device.

11. The computing device of claim 8, wherein the memory further includes instructions that when executed by the at least one processor, cause the computing device to perform the steps of:

conveying, by the application management agent, the main executable file and the identified application components to the remote server;

on the remote server, creating the application package comprised of the main executable file and the identified components of the application, the application package being deployable on a second endpoint device to install the application on the second computing device.

12. The computing device of claim 8, wherein the memory further includes instructions that when executed by the at least one processor, cause the computing device to perform the steps of:

identifying, by the application management agent, what applications are installed on the endpoint device;

conveying, by the application management agent, information identifying the installed applications to the remote server;

indicating, to an administrator, the installed applications and prompting the administrator to select installed applications for which to capture application packages;

receiving an indication from the administrator to capture an application package for the application; and in response to the indication from the administrator, sending the instruction to the application management agent from the remote server to capture the application package.

13. The computing device of claim 8, wherein the sandboxed environment is implemented on the endpoint device via one of:

a virtual machine running on a hypervisor; or
an application virtualizing tool running on the endpoint device.

14. The computing device of claim 8, wherein the application is launched inside the sandboxed environment when a user of the endpoint device opens the application to use the application.

15. A non-transitory computer readable storage medium comprising one or more sequences of instructions, the instructions when executed by one or more processors causing the one or more processors to execute the operations of:

conveying an instruction to the application management agent from the remote server to capture the application package;

in response to the instruction, by the application management agent, setting up a sandboxed environment on the endpoint device, the sandboxed environment being an isolated environment within the endpoint device that monitors all accesses by code running within the sandboxed environment;

locating a main executable file of the application on the endpoint device;

moving the main executable file to the sandboxed environment;

launching the application in the sandboxed environment by executing the main executable file in the sandboxed environment; and identifying the components of the application, comprising: detecting, by the sandboxed environment, accesses to components of the application located outside of the sandboxed environment by the main executable file executing in the sandboxed environment.

16. The non-transitory computer readable storage medium of claim 15, wherein identifying the components of the application further comprises:

moving the components of the application located outside of the sandboxed environment that are accessed by the main executable file executing in the sandboxed environment into the sandboxed environment;

detecting, by the sandboxed environment, accesses to further components of the application located outside of the sandboxed environment by the application components moved into the sandboxed environment; and moving the further components of the application into the sandboxed environment.

17. The non-transitory computer readable storage medium of claim 15, further comprising instructions that when executed by the one or more processors cause the one or more processors to execute the operations of:

creating the application package comprised of the main executable file and the identified components of the application, the application package being deployable on a second endpoint device to install the application on the second computing device.

18. The non-transitory computer readable storage medium of claim 15, further comprising instructions that when executed by the one or more processors cause the one or more processors to execute the operations of:

conveying, by the application management agent, the main executable file and the identified application components to the remote server;

on the remote server, creating the application package comprised of the main executable file and the identified components of the application, the application package being deployable on a second endpoint device to install the application on the second computing device.

19. The non-transitory computer readable storage medium of claim 15, further comprising instructions that when executed by the one or more processors cause the one or more processors to execute the operations of:
- identifying, by the application management agent, what applications are installed on the endpoint device;
- conveying, by the application management agent, information identifying the installed applications to the remote server;
- indicating, to an administrator, the installed applications and prompting the administrator to select installed applications for which to capture application packages;
- receiving an indication from the administrator to capture an application package for the application; and
- in response to the indication from the administrator, sending the instruction to the application management agent from the remote server to capture the application package.

20. The non-transitory computer readable storage medium of claim 15, wherein the sandboxed environment is implemented on the endpoint device via one of:
- a virtual machine running on a hypervisor; or
- an application virtualizing tool running on the endpoint device.

* * * * *